United States Patent
Kanazawa et al.

(10) Patent No.: US 10,721,738 B2
(45) Date of Patent: *Jul. 21, 2020

(54) BASE STATION DEVICE, GATEWAY DEVICE, CALL CONNECTING METHOD, AND WIRELESS COMMUNICATION SYSTEM

(71) Applicant: Sun Patent Trust, New York, NY (US)

(72) Inventors: Takeshi Kanazawa, Kanagawa (JP); Yoshikazu Ishii, Osaka (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/561,987

(22) Filed: Sep. 5, 2019

(65) Prior Publication Data

US 2019/0394778 A1 Dec. 26, 2019

Related U.S. Application Data

(63) Continuation of application No. 15/240,929, filed on Aug. 18, 2016, now Pat. No. 10,455,577, which is a (Continued)

(30) Foreign Application Priority Data

Oct. 30, 2008 (JP) ................................ 2008-280339

(51) Int. Cl.
*H04W 72/04* (2009.01)
*H04M 7/12* (2006.01)
(Continued)

(52) U.S. Cl.
CPC ......... *H04W 72/0453* (2013.01); *H04M 3/16* (2013.01); *H04M 7/1235* (2013.01);
(Continued)

(58) Field of Classification Search
None
See application file for complete search history.

(56) References Cited

U.S. PATENT DOCUMENTS

| 5,818,824 A | 10/1998 | Lu et al. |
| 8,064,909 B2 | 11/2011 | Spinelli et al. |

(Continued)

FOREIGN PATENT DOCUMENTS

| CN | 101242645 A | 8/2008 |
| JP | 2008-511251 A | 4/2008 |

(Continued)

OTHER PUBLICATIONS

3GPP TS 23.060 V7.8.0, "3rd Generation Partnership Project; Technical Specification Group Services and System Aspects; General Packet Radio Service (GPRS); Service description; Stage 2 (Release 7)," Sep. 2008, pp. 1-216.

(Continued)

*Primary Examiner* — Jamaal Henson
(74) *Attorney, Agent, or Firm* — Seed IP Law Group LLP

(57) ABSTRACT

A system is provided which is capable of connecting a call without degrading the security level in a mobile terminal network, even when a call addressed to a user equipment (UE) arrives via the Internet or a home network. A femto base station receives a packet addressed to a UE via the Internet or a home network, and starts a paging procedure. The UE establishes an RRC connection to the femto base station. The UE transmits, to the femto base station, a paging response addressed to the SGSN. The femto base station performs NAS verification. If the femto base station detects the paging response to a paging request that the femto base station itself has issued, the femto base station changes the service type of the service request received from the UE from the paging response to signaling.

4 Claims, 15 Drawing Sheets

Related U.S. Application Data continuation of application No. 14/875,102, filed on Oct. 5, 2015, now Pat. No. 9,451,079, which is a continuation of application No. 13/851,486, filed on Mar. 27, 2013, now Pat. No. 9,185,557, which is a continuation of application No. 13/123,709, filed as application No. PCT/JP2009/005752 on Oct. 29, 2009, now Pat. No. 8,428,596.

(51) Int. Cl.

| | | |
|---|---|---|
| *H04W 68/00* | (2009.01) | |
| *H04M 3/16* | (2006.01) | |
| *H04W 12/06* | (2009.01) | |
| *H04W 40/00* | (2009.01) | |
| *H04W 68/02* | (2009.01) | |
| *H04M 3/20* | (2006.01) | |
| *H04W 84/04* | (2009.01) | |
| *H04W 88/16* | (2009.01) | |
| *H04W 88/08* | (2009.01) | |
| *H04W 88/02* | (2009.01) | |

(52) U.S. Cl.
CPC ......... *H04W 12/06* (2013.01); *H04W 40/005* (2013.01); *H04W 68/00* (2013.01); *H04W 68/02* (2013.01); *H04W 72/042* (2013.01); *H04M 3/205* (2013.01); *H04M 2207/18* (2013.01); *H04W 84/045* (2013.01); *H04W 88/02* (2013.01); *H04W 88/08* (2013.01); *H04W 88/16* (2013.01)

(56) References Cited

U.S. PATENT DOCUMENTS

| | | | |
|---|---|---|---|
| 2004/0048610 A1 | 3/2004 | Kim et al. | |
| 2004/0085926 A1 | 5/2004 | Hwang et al. | |
| 2005/0083913 A1* | 4/2005 | Choi | H04W 76/40 370/352 |
| 2005/0265279 A1* | 12/2005 | Markovic | H04W 92/02 370/328 |
| 2006/0035672 A1 | 2/2006 | Semper | |
| 2006/0040681 A1 | 2/2006 | Julka et al. | |
| 2007/0097938 A1 | 5/2007 | Nylander et al. | |
| 2008/0057961 A1 | 3/2008 | Sun et al. | |
| 2008/0102794 A1* | 5/2008 | Keevill | H04W 88/08 455/411 |
| 2011/0179168 A1* | 7/2011 | Nylander | H04W 12/08 709/225 |
| 2011/0195737 A1* | 8/2011 | Kanazawa | H04M 3/16 455/509 |
| 2012/0076120 A1 | 3/2012 | Kovvali et al. | |

FOREIGN PATENT DOCUMENTS

| | | |
|---|---|---|
| JP | 2009-510972 A | 3/2009 |
| WO | 2005/018113 A1 | 2/2005 |
| WO | 2006/049422 A1 | 5/2006 |

OTHER PUBLICATIONS

3GPP TS 25.467 V0.0.0, "3rd Generation Partnership Project; Technical Specification Group Radio Access Network; UTRAN architecture for 3G Home NodeB; Stage 2 (Release 8)," Sep. 2008, pp. 1-7.

3GPP TS 24.008 V8.3.0, "3rd Generation Partnership Project; Technical Specification Group Core Network and Terminals; Mobile radio interface Layer 3 specification; Core network protocols; Stage 3 (Release 8)," Sep. 2008, pp. 1-556.

Alcatel-Lucent, Qualcomm, "Local Breakout—Home (e) Node B," S1-082085, 3GPP TSG-SA1 #41, Sophia Antipolis, France, Jul. 21-25, 2008, 1 page.

Extended European Search Report dated Jul. 21, 2014, for corresponding EP Application No. 09823335.6-1857 / 2341747, 8 pages.

International Search Report dated Dec. 14, 2009, for corresponding International Application No. PCT/JP2009/005752, 1 page.

\* cited by examiner

| IE/GROUP NAME | IE TYPE AND REFERENCE |
|---|---|
| SR MODIFICATION REQUEST | |
| >MODIFICATION NECESSITY | ENUMERATED (NECESSARY, NOT NECESSARY) |
| >MODIFICATION CONTENTS | ENUERATED (PAGING RESPONSE->SIGNALING ,.. |

| IE/GROUP NAME | IE TYPE AND REFERENCE |
|---|---|
| SR MODIFICATION INDICATOR | |
| > MODIFICATION NECESSITY | ENUMERATED (NECESSARY, NOT NECESSARY) |
| MODIFICATION CONTENTS | ENUMERATED (PAGING RESPONSE -> SIGNALING, ...) |

BASE STATION DEVICE, GATEWAY DEVICE, CALL CONNECTING METHOD, AND WIRELESS COMMUNICATION SYSTEM

BACKGROUND

Technical Field

The present invention relates to a base station apparatus, gateway apparatus, call connection establishment method and wireless communication system, for controlling call connection establishment.

Description of the Related Art

A macro cell base station apparatus for wireless communication (macro base station) having a large cell radius is provided mainly outdoors, and, in addition to this, 3rd Generation Partnership Project (3GPP) is studying to provide a femto cell base station apparatus (femto base station) having a cell radius of approximately several tens of meters in a household, office, and an indoor facility such as a restaurant.

FIG. 1 shows a system configuration in the event a femto base station is provided in a household. As shown in FIG. 1, in a household, it is likely that, in addition to a femto base station, an IP telephone, an IP-TV, and furthermore a plurality of personal computers and suchlike devices, share one xDSL, FTTH or suchlike Internet-connecting network via fixed-line system. The femto base station is connected with a core network via a concentrator (GW).

Lately, to provide a solution for increasing traffic of, for example, data communication, many mobile operators are forced to improve equipment and facilities. Consequently, by introducing a femto base station, it is possible to keep the cost lower than providing additional base stations outdoors and off-load indoor-originated communication traffic directly to the Internet. By this means, it is expected to reduce load of a core network in a mobile network system. Also, in future, a communication device in a user's premise and a mobile terminal are expected to be able to communicate directly with each other, via a femto base station, without traversing mobile operator's core network, and provide various interactive services to the user.

Next, the steps of call connection establishment in an IMT-2000 packet system, disclosed in non-patent literature 1 for example, will be described using FIG. 2. Referring to FIG. 2, a UE, after a connection established with a Radio Network Controller (RNC) through Radio Resource Control (RRC) call connection establishment procedure (ST 11), requests a start of service to an SGSN, using a service request, which is a GPRS Mobility Management (GMM) protocol signal (ST 12). A service request message includes information to request a signaling connection (connection for signaling) between the UE and the SGSN (service type: signaling).

The SGSN performs authentication processing for the UE having requested signaling connection (ST 13), and, if, as a result of this, the UE is identified as a valid UE, indicates RNC to initiate ciphering processing for a radio connection by a security mode command, which is an RANAP signal (ST 14). Then, if ciphering processing has been performed successfully, the UE requests call connection establishment using a PDP context activation request (or "Activate Packet Data Protocol Context Request"), which is a Session Management (SM) signal (ST 15).

In this SM signal, an Access Point Name (APN) to specify a target data network (packet data network: PDN) for the connection is provided, so that the SGSN, upon receiving this SM signal, acquires IP address information of the GGSN to connect to, based on the APN information, through a Domain Name System (DNS) procedure. Then, upon successfully acquiring the IP address of the GGSN, the SGSN transmits an RAB Assignment Request, which is an RANAP signal, to the RNC, and requests tunnel establishment between the RNC and the SGSN (ST 16).

Next, the SGSN, having checked the tunnel established between the RNC and the SGSN, transmits a PDP context creating request (or "Create PDP Context Request"), which is a GPRS Tunneling Protocol (GTP) signal, to the GGSN having the IP address acquired through the DNS procedure, and requests call connection establishment for the UE (ST 17).

In this GTP signal, also, APN information is provided, so that GGSN having received the GTP signal can identify the PDN to establish the connection, based on the APN information. When the GGSN successfully completes call connection establishment processing, the SGSN is reported that call connection establishment processing has been performed successfully, by means of a PDP context creating response (or "Create PDP Context Response"), which is a GTP signal (ST 18). At this point in time the GGSN configures routing information (i.e., route selection) for the UE, and manages the routing information as PDP context.

Next, a response signal from the GGSN is transmitted to the UE using a PDP context activation accept (or "Activate PDP Context Accept"), which is an SM signal (ST 19), and the UE starts transmitting and receiving user data (i.e., packet communication) (ST 20). At this point in time, the SGSN configures routing information for the UE, and manages the routing information as PDP context.

In this way, through the above series of processing, an IMT-2000 packet system sets up logical connections between a UE and a GGSN on a per connection basis and performs tunneling, thereby enabling packet communication.

Next, the steps of traffic off-loading for communication traffic between a femto base station and the Internet or home network, without traversing mobile operator's core network, will be described using FIG. 3. Note that, parts in FIG. 3 that are the same as in FIG. 2 will be assigned the same reference codes as in FIG. 2, and their detailed descriptions will be omitted. Assume here that the femto base station has the SGSN and GGSN functionalities shown in FIG. 2. Also, since the UE cannot be attached to more than one SGSN at the same time, another assumption is given that the UE keeps being attached to one SGSN that is located in a core network.

The femto base station, having received a PDP context activation request transmitted from the UE, does not transfer this request to the SGSN, and, instead, selects a PDN to connect to, based on APN information, using its own SGSN function (ST 21). Assume that, for example, the ISP to provide broadband access to the user's home can be identified based on information included in APN.

The femto base station determines to process call connection establishment for the UE using its co-located GGSN function which the femto base station owns. Later, by performing processing from ST 16 to ST 20 in FIG. 2 using the GGSN, SGSN, RNC and Node B functionalities provided in the femto base station, it is possible to establish logical connections between the UE and the GGSN, on a per connection basis, and consequently enable communication traffic originating from a femto base station to be off-loaded directly to the Internet or home network, without traversing a mobile operator's core network.

CITATION LIST

Non-Patent Literature

NPL 1: 3GPP TS23.060 v7.8.0

BRIEF SUMMARY

Technical Problem

However, there are, for example, following problems on the above-noted off-loading method to incoming traffic via a femto base station directly from the Internet or home network.

Normally, the steps of receiving an incoming call for a UE in idle state are initiated as a paging procedure with broadcasting within a specific area to discover the UE. With the paging, when information to indicate an incoming call for a UE arrives at an SGSN, the SGSN transmits information indicating that a UE has received the incoming call, to base stations in the UE's registered service area.

The UE can detect whether there is an incoming call for the UE based on signals from a base station at predetermined timing. When there is an incoming call detected, the UE transmits a service request shown in FIG. 2 to the SGSN (ST 12). The service request includes information to indicate that the service request is a response to paging (service type: paging response). Following this, through the call connection establishment procedure shown in FIG. 2, logical connections are established between the UE and the GGSN on a per connection basis and tunneling is performed, thereby enabling packet communication.

Next, FIG. 4 shows the steps of call connection establishment when an incoming call for a UE arrives at a femto base station from the Internet or home network. In FIG. 4, a femto base station receives a packet for a UE from the Internet or home network (ST 22).

The femto base station transmits a paging message to the UE using the co-located SGSN and GGSN functionalities in the femto base station (ST 23).

As mentioned above, the UE is attached to an SGSN in a core network, and, upon detecting paging, transmits a service request including information as a paging response, to the SGSN in the core network (ST 24).

In the SGSN in the core network having received the service request (service type: paging response) from the UE, there is no record paging message having been transmitted to the UE, so that the SGSN detects that an incorrect service request has been received from the UE, and transmits a service rejecting message (or "Service Reject") to the UE (ST 25).

If a service request is rejected by the SGSN, subsequent security procedures (UE authentication, preparation related to radio interval ciphering, etc.) cannot be performed, and the UE is unable to successfully finish the call connection establishment procedure for the incoming call from the Internet or home network.

A possible solution to the above problem is to temporarily attach the UE to an SGSN co-located in a femto base station, and process a service request from the UE in the co-located SGSN in the femto base station. However, in this case, since security procedures are carried out in the co-located SGSN of the femto base station, information related to the UE authentication needs to be moved from the core network SGSN to the femto cell. That is to say, important information related to user authentication is memorized in a femto base station which is likely to be provided in a general user's home, and, as a result of this, there is a possibility that the security level might be degraded.

It is therefore one of objectives of the present invention to provide a base station apparatus, gateway apparatus, call connection establishment method and wireless communication system that, when there is an incoming call for a UE from the Internet or home network, are able to carry out connection setup successfully without decreasing the security level in a mobile communication network.

Solution to Problem

A base station apparatus according to the present invention adopts a configuration having: a receiving section that receives a paging response to a paging from a wireless communication terminal apparatus; a judging section that judges whether the paging response is a response to the paging which the base station apparatus has issued; and a transmitting section that, when the paging response is judged to be a response to the paging which the base station apparatus has issued, includes a request for change of a service request in the paging response, and transmits the paging response to a gateway apparatus.

Advantageous Effects of Invention

According to the present invention, when there is an incoming call for a UE from the Internet or home network, it is possible to carry out call connection establishment successfully without degrading the security level in a mobile communication network.

DETAILED DESCRIPTION

Now, embodiments of the present invention will be described in detail with reference to the accompanying drawings. The following embodiments will be each described based on a wireless access technology standardized by 3GPP, such as General Packet Radio Service (GPRS) and Universal Mobile Telecommunications System (UMTS).

However the present invention is not limited to Long Term Evolution (LTE) that is being presently standardized by 3GPP or wireless access technologies standardized by 3GPP, but is equally applicable to WLAN (Wireless Local Area Network), Worldwide Interoperability for Microwave Access (WiMAX) technologies such as IEEE802.16, IEEE802.16e and IEEE802.16m, and still other wireless access technologies such as 3GPP2.

Embodiment 1

Figure 1:
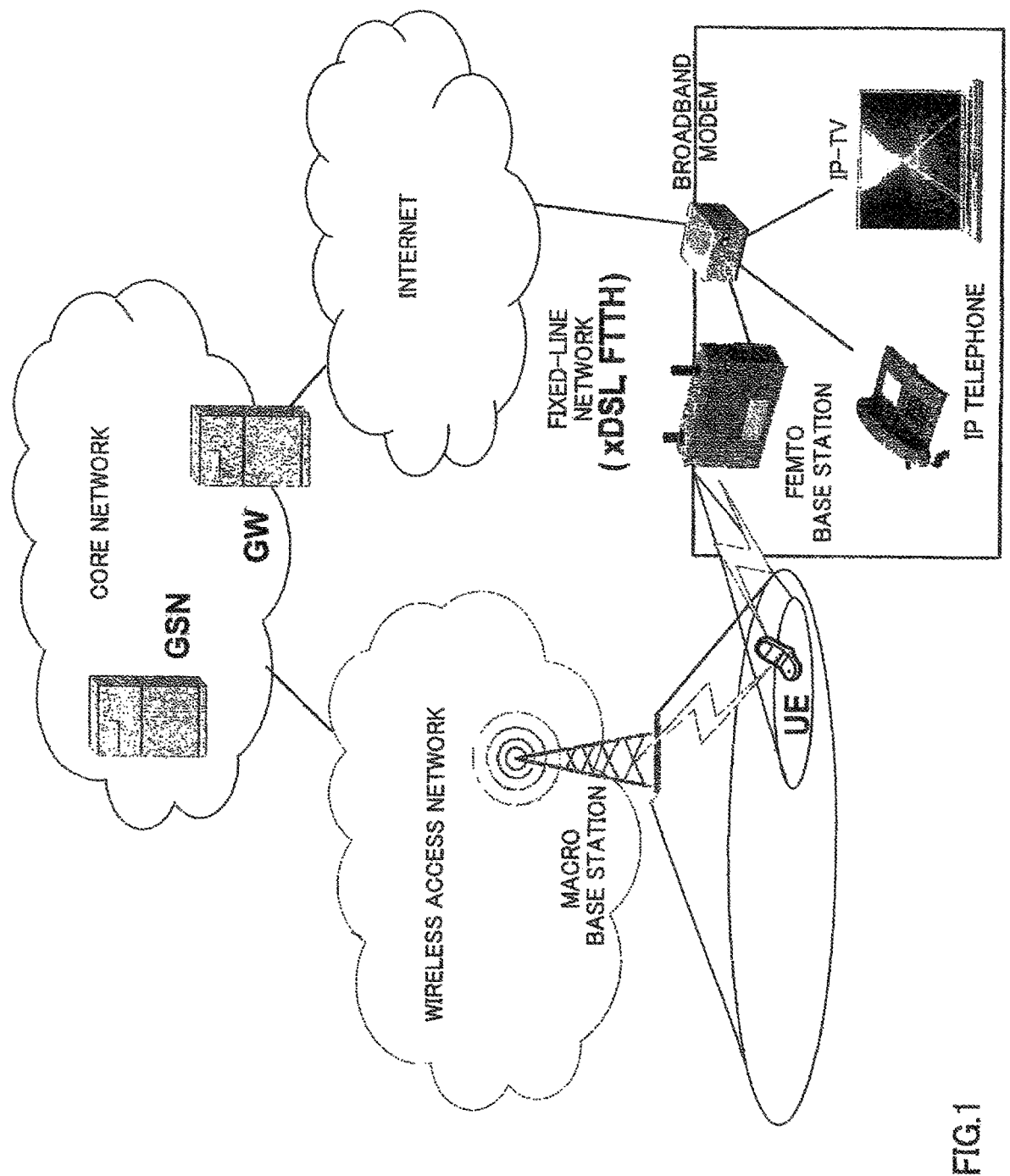
FIG. 1 shows a configuration of a wireless communication system.
Figure 2:
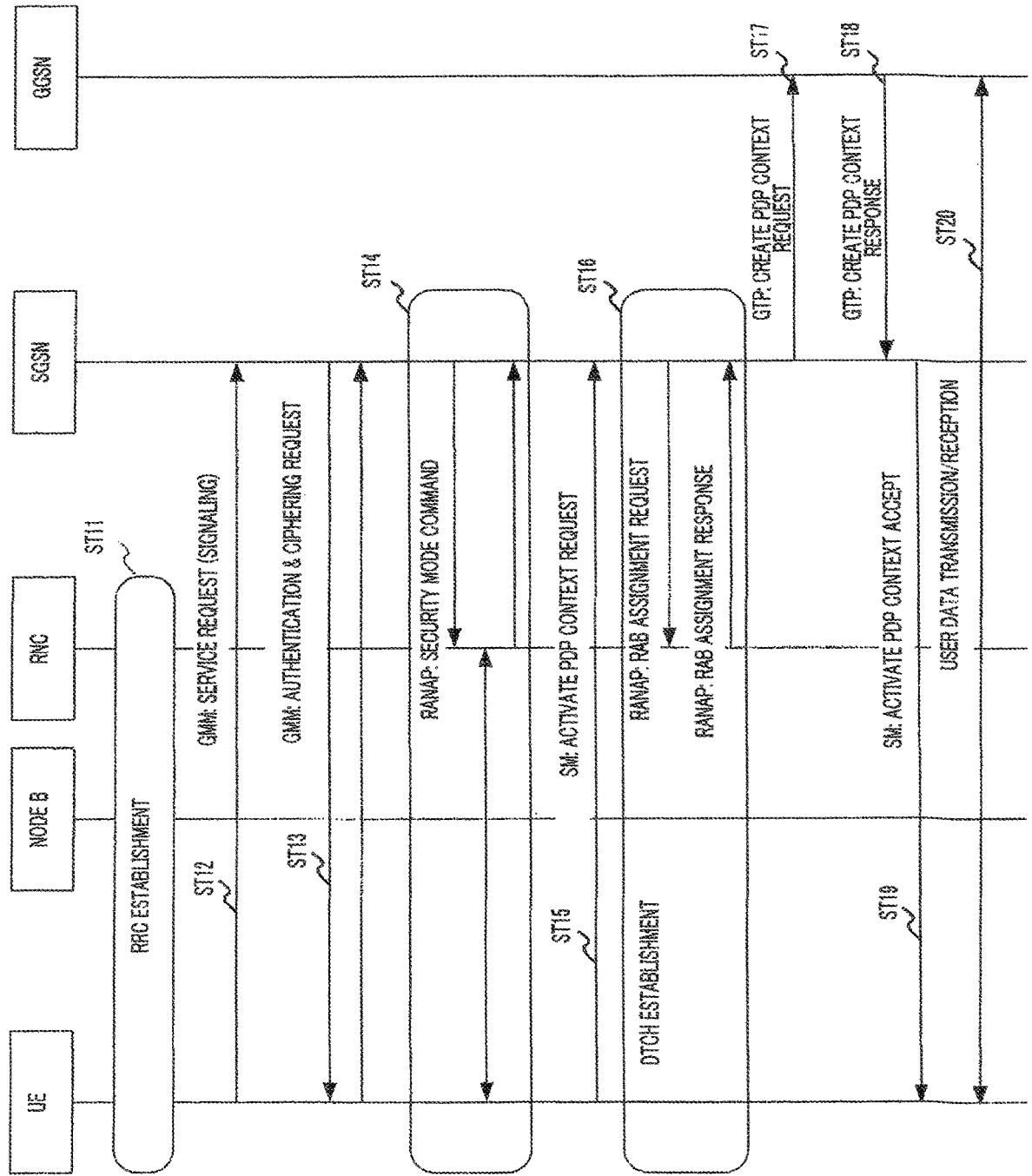
FIG. 2 is a sequence diagram showing the steps of call connection establishment in an IMT-2000 packet system.
Figure 3:
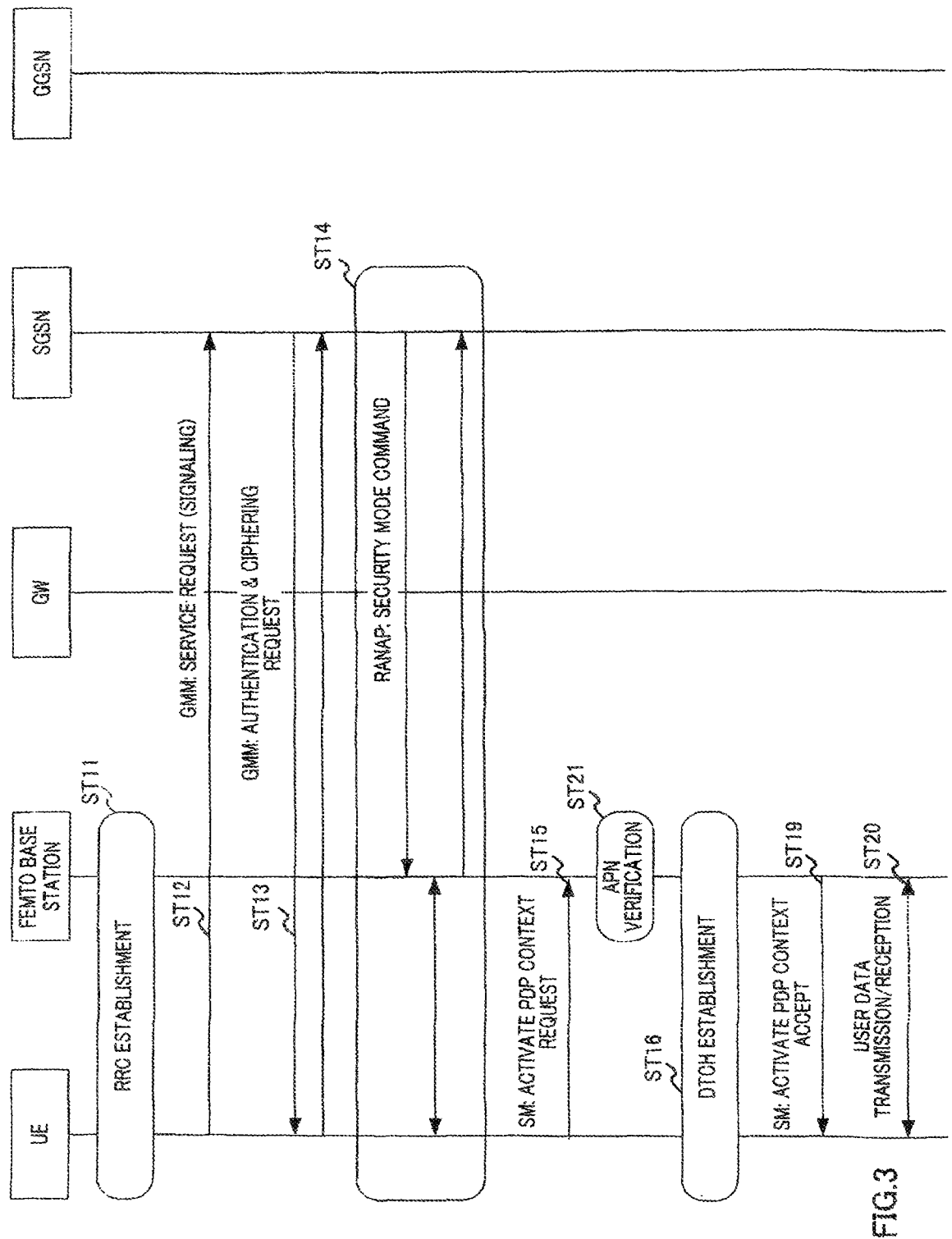
FIG. 3 is a sequence diagram showing the steps of directly off-loading communication traffic originating from a femto base station, to the Internet or home network.
Figure 4:
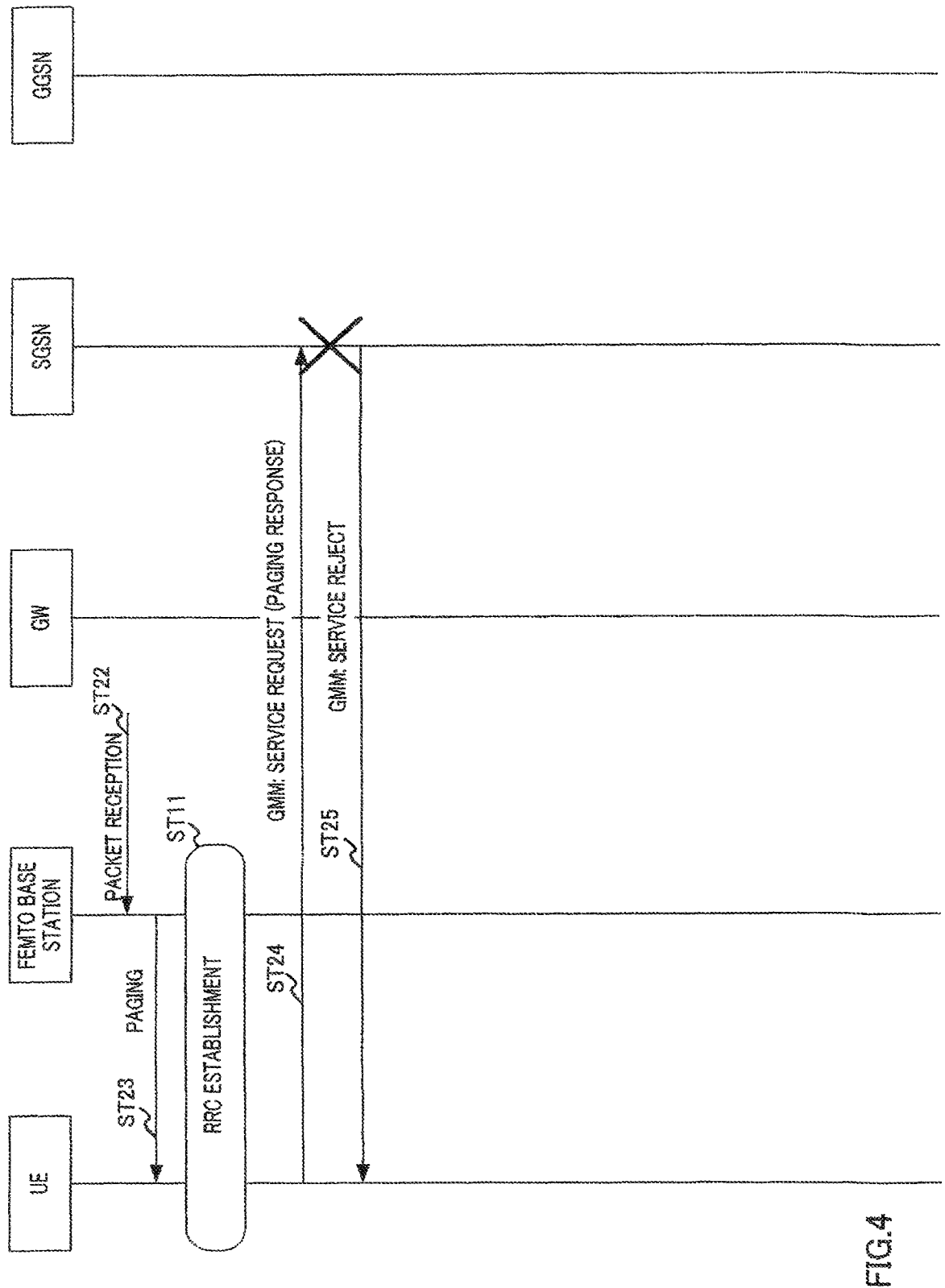
FIG. 4 is a sequence diagram showing the steps of call connection establishment in the event there is an incoming call for a UE, in a femto base station, from the Internet or home network.
Figure 5:
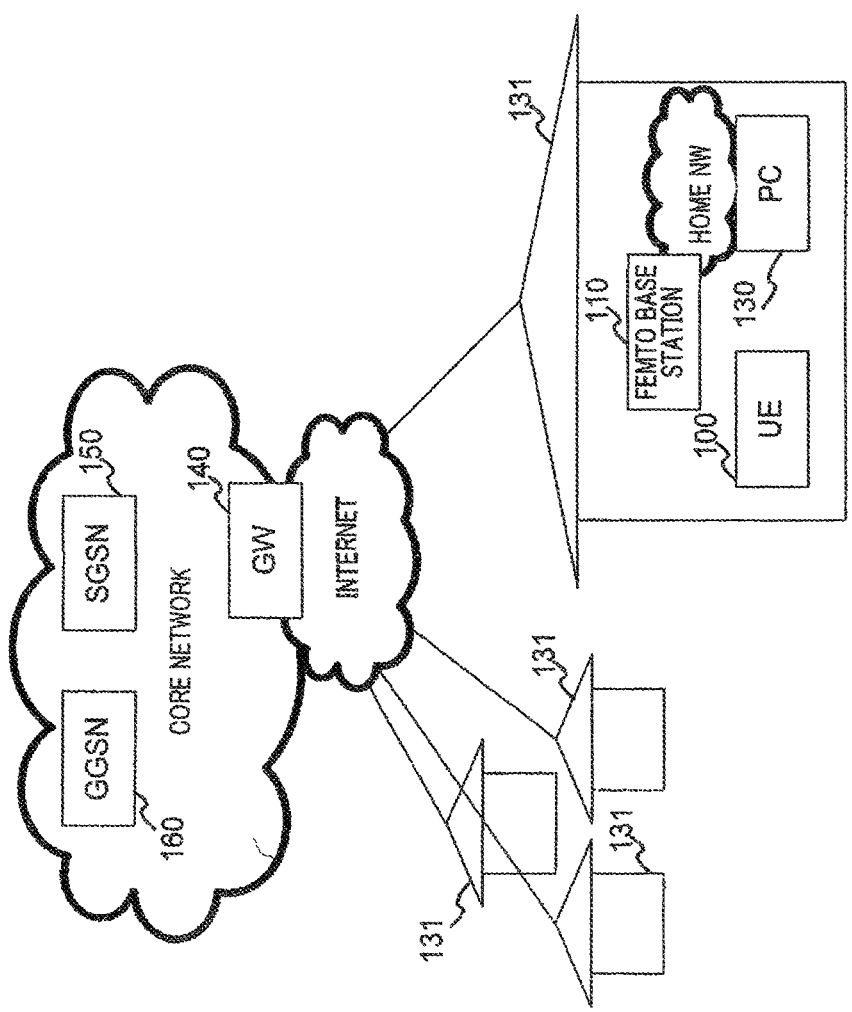
FIG. 5 shows a configuration of a wireless communication system according to embodiment 1 of the present invention.

FIG. 5 shows a configuration of a wireless communication system according to embodiment 1 of the present invention. The wireless communication system shown in FIG. 5 has UE 100, femto base station 110, GW 140, and a core network.

Femto base station 110 is provided in a user's premise (home) 131, assigns and manages resources for wireless connections, receives information that is transferred via the physical layer of UE 100 for uplink traffic, and transfers received downlink data for UE 100. That is to say, femto base station 110 plays a role of an access point for UE 100, on a wireless access network.

UE 100 communicates with the core network, the Internet or home network, via femto base station 110. In the home network, PC 130 is provided for example, and PC 130 and UE 100 communicate directly, via femto base station 110, without traversing the core network, and provides various interactive services to the user.

GW 140 is located between femto base station 110 and a core network, and concentrates and relays communications between SGSN 150 in the core network and a plurality of femto base stations 110. Such a configuration to place femto base station non-transparently to the core network nodes makes it possible to deploy a large number of femto base stations 110, without increasing the processing load of core network equipments.

SGSN 150 and GGSN 160 are provided in the core network, so that SGSN 150, upon receiving a service request from UE 100, performs an authentication process for UE 100 and controls call connection establishment processing between GW 140 and GGSN 160. Also, GGSN 160 manages addresses for data communication, to assign to UE 100, required for packet communication.

Figure 6:
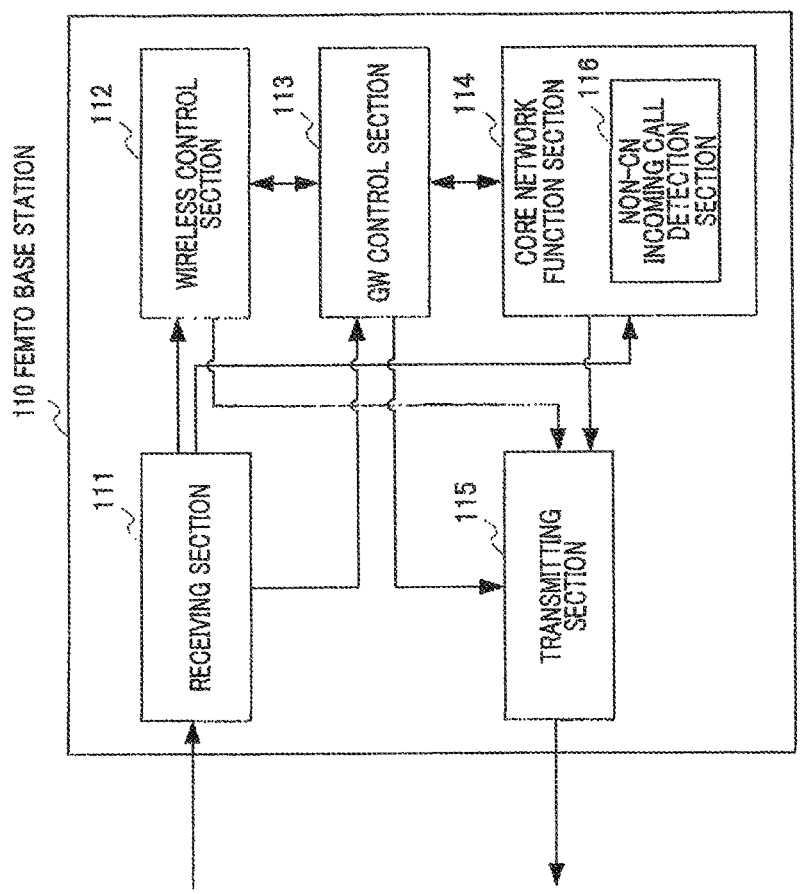
FIG. 6 is a block diagram showing a configuration of the femto base station shown in FIG. 5.

FIG. 6 is a block diagram showing a configuration of femto base station 110 shown in FIG. 5. In FIG. 6, receiving section 111 outputs an RRC signal and uplink user data transmitted from UE 100, to wireless control section 112. Also, receiving section 111 outputs a Home Node B Application Part (HNBAP) signal, RANAP User Adaptation (RUA) signal and downlink user data for UE 100, transmitted from GW 140, to GW control section 113. Also, receiving section 111 outputs data received as input directly from the Internet or home network, to core network function section 114.

Wireless control section 112 terminates the RRC signal output from receiving section 111, and establishes an RRC connection with UE 100. Also, from the RRC signal, wireless control section 112 judges that UE 100 is requesting transmission/reception of Non-Access Stratum (NAS) information with the core network, and outputs NAS information to GW control section 113. Furthermore, wireless control section 112 encodes control information output from GW control section 113 as an RRC signal, and outputs the RRC signal to UE 100 via transmitting section 115.

Also, wireless control section 112, upon receiving uplink user data from UE 100, terminates the wireless protocol and outputs the user data to GW control section 113. Also, wireless control section 112, upon receiving downlink user data for UE 100 from GW control section 113, performs wireless protocol processing according to predetermined parameter 1 and transmits data to UE 100 via transmitting section 115.

GW control section 113 processes the HNBAP or RUA signal output from receiving section 111, and terminates the RANAP signal from the core network. Also, GW control section 113 judges whether or not it is necessary to transmit an RRC signal to UE 100, based on the RANAP signal or a control signal output from network function section 114, and, if transmission is necessary, outputs control information that is output from the core network or core network function section 114, to wireless control section 112.

Also, GW control section 113 requests core network function section 114 to judge whether or not NAS information for UE 100 output from wireless control section 112, or NAS information from the core network, needs to be processed. Based on the judgment result in core network function section 114, GW control section 113 includes NAS information for UE 100 in RANAP, adds NAS updating request information to an HNBAP or RUA signal, and transmits these to GW 140 via transmitting section 115.

Also, when NAS information for UE 100 is output from core network function section 114, GW control section 113 outputs the NAS information to wireless control section 112. GW control section 113, upon receiving downlink user data for UE 100 from GW 140 or core network function section 114, terminates transport network protocol and outputs user data to wireless control section 112. Also, when uplink user data for UE 100 is output from wireless control section 112, GW control section 113 performs transport network protocol processing according to predetermined parameter 1, and transmits uplink user data to GW 140 via transmitting section 115, or outputs uplink user data to core network function section 114.

Core network function section 114 receives data for UE 100, received directly from the Internet or home network via receiving section 111, and outputs a control signal for establishing logical connection for UE 100, to GW control section 113.

Also, core network function section 114 determines whether femto base station 110 needs to process the NAS information received from UE 100 based on NAS information processing necessity judging request output from GW control section 113. Upon processing NAS information, core network function section 114 outputs information for requesting GW 140 to update this NAS information based on NAS information received, or generates NAS information for UE 100 and outputs the generated NAS information to GW control section 113. On the other hand, when NAS information needs not be processed, core network function section 114 instructs GW control section 113 to promptly output the received NAS information to GW 140. Incidentally, core network function section 114 functions as a judging means.

Also, when uplink user data for UE 100 is output from GW control section 113, core network function section 114 performs packet data network protocol processing according to predetermined parameter 1, and transmits data to the Internet or home network via transmitting section 115. Also, when downlink user data for UE 100 is output from receiving section 111, core network function section 114 terminates the packet data network protocol and outputs data to GW control section 113.

Core network function section 114 has non-CN incoming call detection section 116, and, when there is an incoming call directly from the Internet or user's home network without involving the core network (CN), non-CN incoming call detection section 116 memorizes that the incoming call is a call from outside the core network.

Transmitting section 115 transmits an RRC control signal output from wireless control section 112, to UE 100. Also, transmitting section 115 transmits downlink data for UE 100, output from wireless control section 112, to UE 100. Also, transmitting section 115 transmits NAS information for UE 100, output from GW control section 113, to GW 140. Also, transmitting section 115 transmits uplink user data for UE 100, output from GW control section 113, to GW 140, and outputs uplink user data for UE 100, output from core network function section 114, to the Internet or home network.

Figure 7:
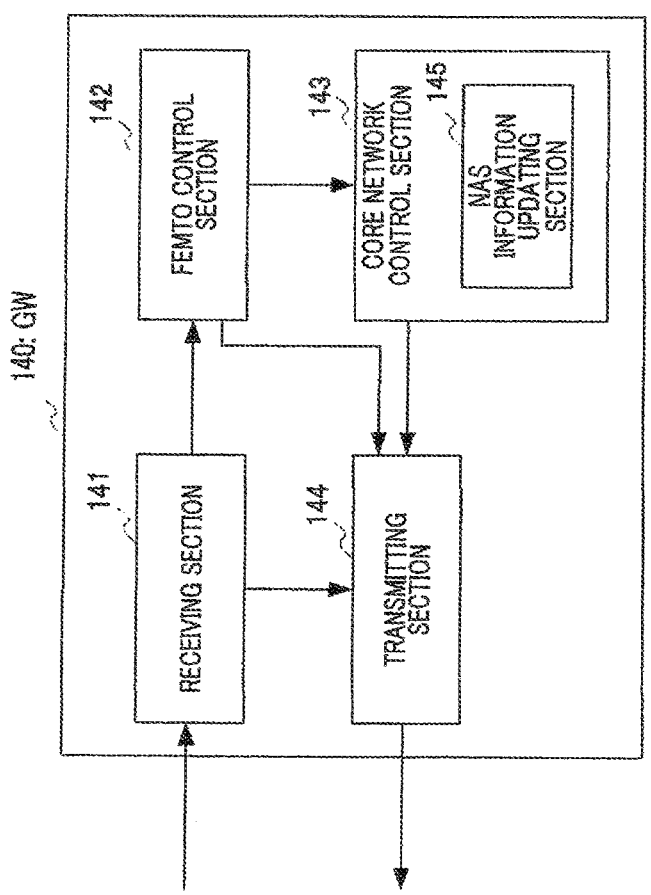
FIG. 7 is a block diagram showing a configuration of the GW shown in FIG. 5.

FIG. 7 is a block diagram showing a configuration of GW 140 shown in FIG. 5. In FIG. 7, receiving section 141 outputs an HNBAP or RUA signal containing NAS information for UE 100, transmitted from femto base station 110, and an RANAP signal, transmitted from the core network, to femto control section 142. Also, receiving section 141, upon receiving uplink user data for UE 100 from femto base station 110, performs predetermined transport network protocol processing, and transmits the uplink user data to the core network via transmitting section 144. Also, upon receiving downlink user data for UE 100 from the core network, receiving section 141 performs predetermined transport network protocol processing with the user data, and transmits the downlink user data to femto base station 110 via transmitting section 144.

Femto control section 142 includes the RANAP signal output from receiving section 141 in an HNBAP or RUA signal according to predetermined parameter 1, and transmits this to femto base station 110 via transmitting section 144. Also, when an HNBAP or RUA signal including NAS information for UE 100 is output from receiving section 141, femto control section 142 terminates the HNBAP or RUA signal, picks up the RANAP signal including NAS information for UE 100, and outputs this RANAP signal to core network control section 143 with the NAS updating request information in the HNBAP or RUA signal.

Core network control section 143 has NAS information updating section 145, and, when RANAP signal containing NAS information for UE 100 is output from femto control section 142, NAS information updating section 145 overwrites and updates the NAS information for UE 100 contained in the RANAP signal, based on the NAS updating request information in HNBAP or RUA signal reported likewise. Also, core network control section 143 outputs the RANAP signal containing updated NAS information for UE 100, to the core network, via transmitting section 144.

Transmitting section 144 transmits the HNBAP or RUA signal containing NAS information for UE 100, output from femto control section 142, to femto base station 110. Also, transmitting section 144 transmits the RANAP signal output from core network control section 143 and containing updated NAS information for UE 100, to the core network. Also, transmitting section 144 transmits the uplink user data for UE 100 output from receiving section 141, to the core network, and transmits the downlink user data to femto base station 110.

Next, the steps of call connection establishment between UE 100 and femto base station 110 when there is an incoming call from the Internet or home premise network for UE 100 in femto base station 110, will be described using FIG. 8.

Figure 8:
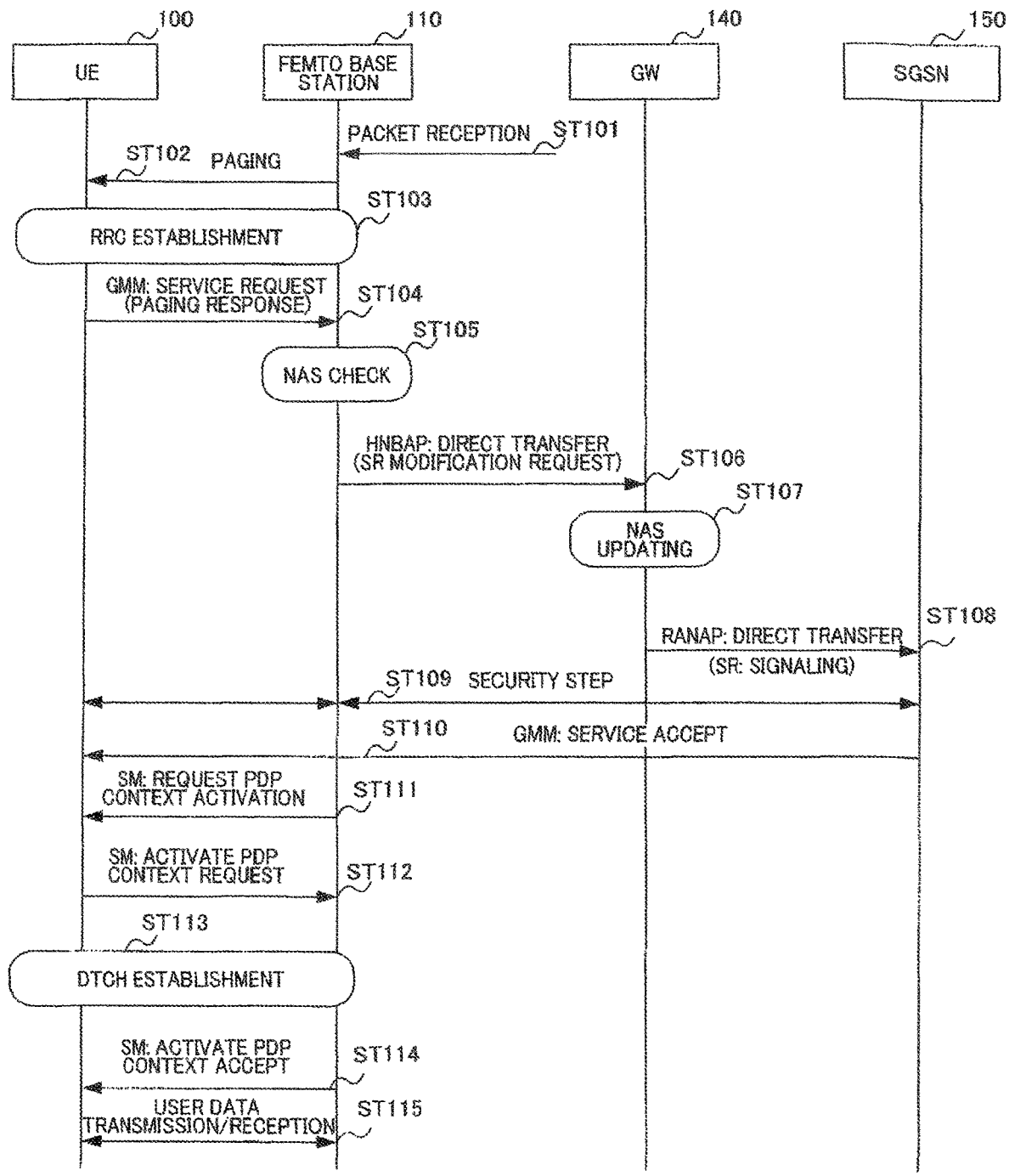
FIG. 8 is a sequence diagram showing the steps of call connection establishment between a UE and a femto base station according to embodiment 1 of the present invention.

In FIG. 8, in ST 101, femto base station 110 receives a packet for UE 100 from the Internet or home network. Core network function section 144 in femto base station 110, having received a packet for UE 100, starts the steps for establishing logical connection for UE 100. In ST 102, core network function section 114 starts a paging step to indicate that a call for UE 100 has been received. Then, femto base station 110 memorizes, in non-CN incoming call detection section 116, information indicating that a paging procedure has been initiated due to a call for UE 100 having been received from the Internet or home network.

In ST 103, UE 100 detects that a call for UE 100 has been received, from a paging request, and establishes RRC connection with femto base station 110. In ST 104, UE 100 transmits a service request towards currently connecting SGSN 150, via femto base station 110, in order to answer the paging request. Incidentally, the service request includes information indicating a paging response.

In ST 105, femto base station 110 decides whether to process the NAS signal received from UE 100 or to forward it to the core network. Core network function section 114 of femto base station 110, upon receiving a NAS information processing necessity judging request from GW control section 113, judges whether the received NAS information (service request: paging response) is a response to the paging request which femto base station 110 transmitted in ST 102, based on information memorized in non-CN incoming call detection section 116 (NAS check).

In ST 106, femto base station 110 encodes the NAS information (service request: paging response) received from UE 100 using an RANAP direct transfer, encodes RANAP using a direct transfer of a protocol complying with the control interface specifications between femto base station 110 and GW 140, and outputs the results to GW 140.

FIG. 9A shows the direct transfer contents of an HNBAP or RUA signal. Also, FIG. 9B shows information elements of NAS updating request information (or "SR Modification Request"). In FIG. 9A, a message type indicating that the message is a direct transfer, a CN domain ID indicating to which CS/CP domain the message is directed, and an RANAP message, which is upper protocol RANAP itself, are included. Furthermore, a direct transfer contains an SR Modification Request, and, as shown in FIG. 9B, this SR Modification Request contains information indicating the necessity to modify the type of the service request in the RANAP message ("Modification Necessity"), and information representing the actual contents to be modified when modification is required ("Modification Contents").

If, according to the judgment result in ST 105, NAS information (service request: paging response) that has been received is a response to a paging request which femto base station 110 has issued, the HNBAP or RUA signal contains NAS updating request information. In this case, the IE type of modification necessity in FIG. 9B shows "Necessary," and the IE type of modification contents shows change from paging response to signaling (paging response→signaling). If, on the other hand, this paging response is a regular paging response to a paging request from the core network, the HNBAP or RUA signal does not contain NAS updating request information, the IE type of modification necessity shows "Not Necessary" and the IE type of modification contents is not referenced in GW 140.

In ST 107, GW 140, having received the HNBAP or RUA signal from femto base station 110, terminates HNBAP or RUA, and picks up the RANAP signal. Then, if NAS updating request information is included in the HNBAP or RUA signal, that is, if the IE type of modification necessity in FIG. 9B shows "Necessary" and the IE type of modification contents shows change from paging response to signaling, GW 140 terminates the RANAP, picks up NAS information (service request: paging response) for UE 100, and updates service type in the NAS information from paging response to signaling. Also, if NAS updating request information is not included in the HNBAP or RUA signal, that is, if the IE type of modification necessity in FIG. 9B shows "Not Necessary," GW 140 does not process the RANAP signal picked up, and thereafter carries out call connection establishment steps prescribed by 3GPP, with the core network.

In ST 108, GW 140 encodes the updated NAS information (service request: signaling) by an RANAP direct transfer again, and transmits the result to SGSN 150 in the core network.

In ST 109, SGSN 150, having received NAS information (service request: signaling) from UE 100, judges that a regular service initiation request has been received from UE 100, and carries out call connection establishment steps prescribed by 3GPP, with UE 100, via femto base station 110.

In ST 110, the core network having finished security procedures with UE 100, transmits "service accept," which indicates that predetermined steps in response to a service request from UE 100 have been successfully performed, to UE 100. Then, if, according to the result of judging the necessity to process NAS information received from SGSN 150, received NAS information indicates a service accept, core network function section 114 of femto base station 110 detects that security procedures have been successfully carried out between UE 100 and SGSN 150, and the signaling connection has been successfully established between them.

In ST 111, using predetermined parameter 1, femto base station 110 requests UE 100 to start the steps of establishing connection for service with UE 100 (or "Request PDP Context Activation"). APN, which is information to specify the connection destination data network (PDN), is set as one of the predetermined parameter 1, and this APN also represents, for example, the ISP network providing broadband access to the user's home.

In ST 112, using the parameter acquired in ST 111, UE 100 requests call connection establishment to femto base station 110 by a PDP context activation request (or "Activate PDP Context Request"), which is an SM (Session Management) signal.

In ST 113, a radio bearer (DTCH) that is adequate for service is established between femto base station 110 and UE 100.

In ST 114, femto base station 110, having checked that a radio bearer with UE 100 has been successfully established, transmits a PDP context activation accept (or "Activate PDP Context Accept"), which is an SM signal, to UE 100, and, in ST 115, UE 100 and femto base station 110 start transmitting and receiving user data (packet communication).

Thus, according to embodiment 1, when there is an incoming call for a UE in a femto base station from the Internet or home network, only when detecting that the paging response received from the UE is the response to the request from the femto base station, the femto base station modifies the service type of a service request transmitted from the UE from paging response to signaling, and forwards the paging response message to a core network. When security procedures are successfully finished between the UE and the core network, the femto base station carries out call connection establishment steps directly between the femto base station and the UE, so that it is possible to transmit communication traffic having directly arrived at the femto base station from the Internet or home network, without degrading the security level in a mobile communication network, and without traversing the core network.

Figure 9:
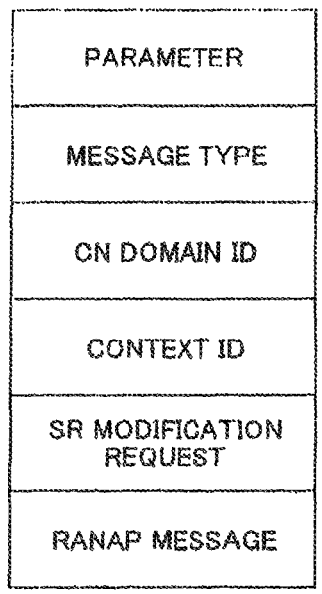
FIG. 9A shows direct transfer contents of an HNBAP or RUA signal.
FIG. 9B shows information elements of NAS updating request information.

Also, although embodiment 1 has been described using UMTS system as an example such that a GW updates NAS information, in an LTE/SAE (Long Term Evolution/System Architecture Evolution) system, the contents of direct transfer message shown in FIG. 9 are different.

Figure 10:
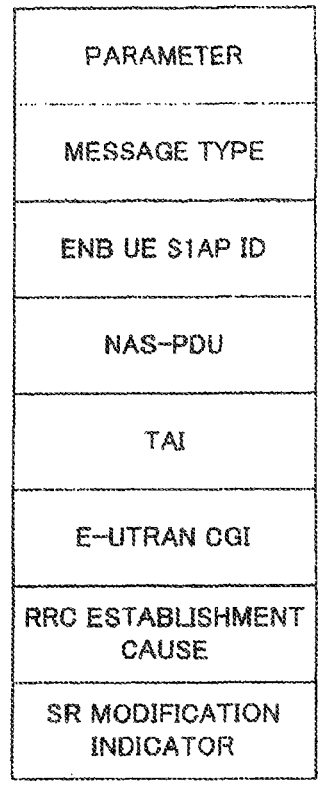
FIG. 10A shows direct transfer contents of an S1AP signal by which NAS information is first transmitted from a UE to a core network.
FIG. 10B shows information elements of a NAS updating command.

FIG. 10A shows the contents of a direct transfer that transfers NAS information, which is contained in an S1AP signal representing a control protocol between a femto base station and a core network, and which is transmitted first from a UE, to a core network, in an LTE/SAE system. Also, FIG. 10B shows information elements of a NAS updating command (or "SR Modification Indicator"). In FIG. 10A, a message type, which shows an indication of a direct transfer to forward NAS information transmitted first from a UE, to a core network, a NAS-PDU, which is NAS information itself, an information element for specifying a UE, a femto base station and so on (eNB UE S1AP ID, TAI, E-UTRAN CGI, etc.), and a reason to start RRC connection (RRC establishment cause), are included. Furthermore, in the direct transfer to transfer the NAS information that is transmitted first from the UE, an SR Modification Indicator is included, and, as shown in FIG. 10B, this SR Modification Request includes information to show the necessity to modify the type of a service request in the NAS-PDU ("Modification Necessity"), and information to show the actual contents of modulation in the event modification is necessary ("Modification Contents").

In the core network having received the SR Modification Indicator, if the IE type of modification necessity in FIG. 10B shows "Necessary" and the IE type of modification contents shows change from paging response to signaling, NAS information having a service type of a paging response is updated to NAS information having a service type of signaling, and subsequent processing is continued.

Embodiment 2

Embodiment 1 has been described such that a femto base station determines whether or not it is necessary to update a service request from a UE, and a GW actually updates the service type of a service request from the UE from paging response to signaling. Consequently, in case that signaling is concentrated in a GW on a temporary basis, the GW is likely to suffer increased load due to RANAP signal terminating processing and NAS information updating processing to be performed. A solution to avoid such possibility will be described in this embodiment 2 of the present invention.

Figure 11:
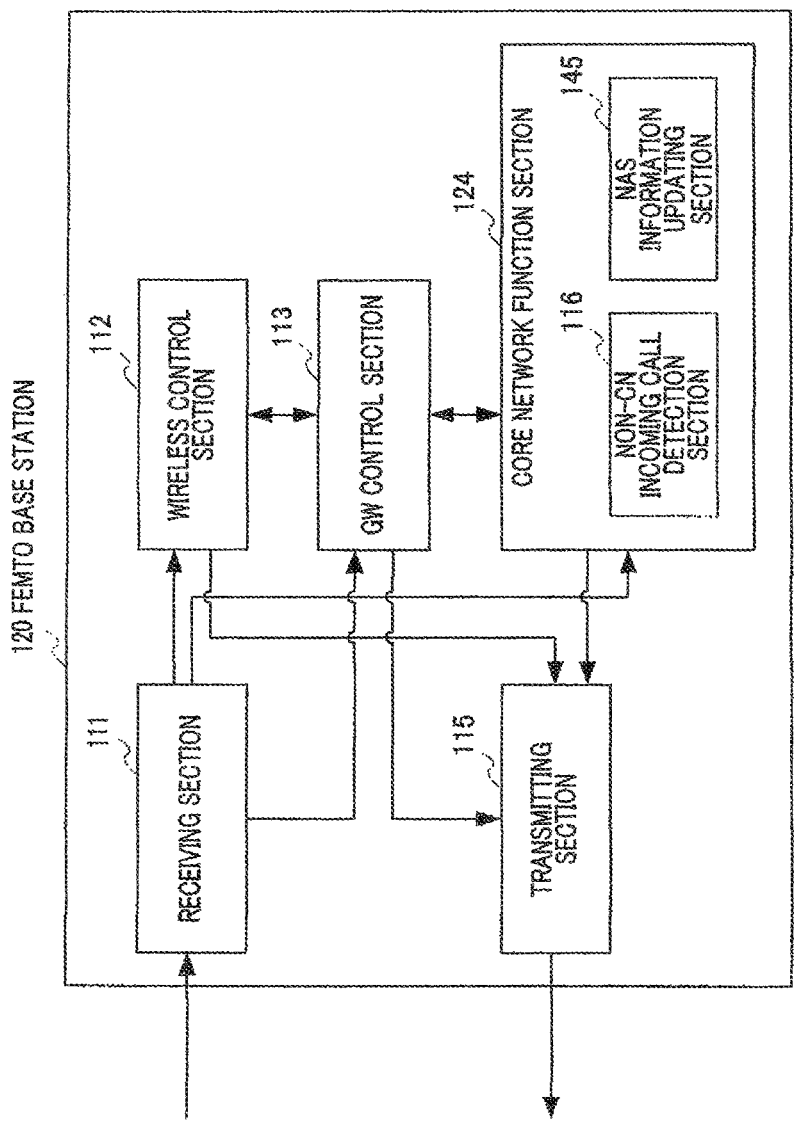
FIG. 11 is a block diagram showing a configuration of a femto base station according to embodiment 2 of the present invention.

FIG. 11 is a block diagram showing a configuration of femto base station 120 according to embodiment 2 of the present invention. Note that, parts in FIG. 11 that are the same as in FIG. 6 will be assigned the same reference codes as in FIG. 6, and their detailed descriptions will be omitted. FIG. 11 is different from FIG. 6 in adding NAS information updating section 145 to core network function section 124.

When NAS information for UE 100 and NAS updating request information are output from GW control section 113, NAS information updating section 145 updates the NAS information for UE 100 based on the NAS updating request information.

Figure 12:
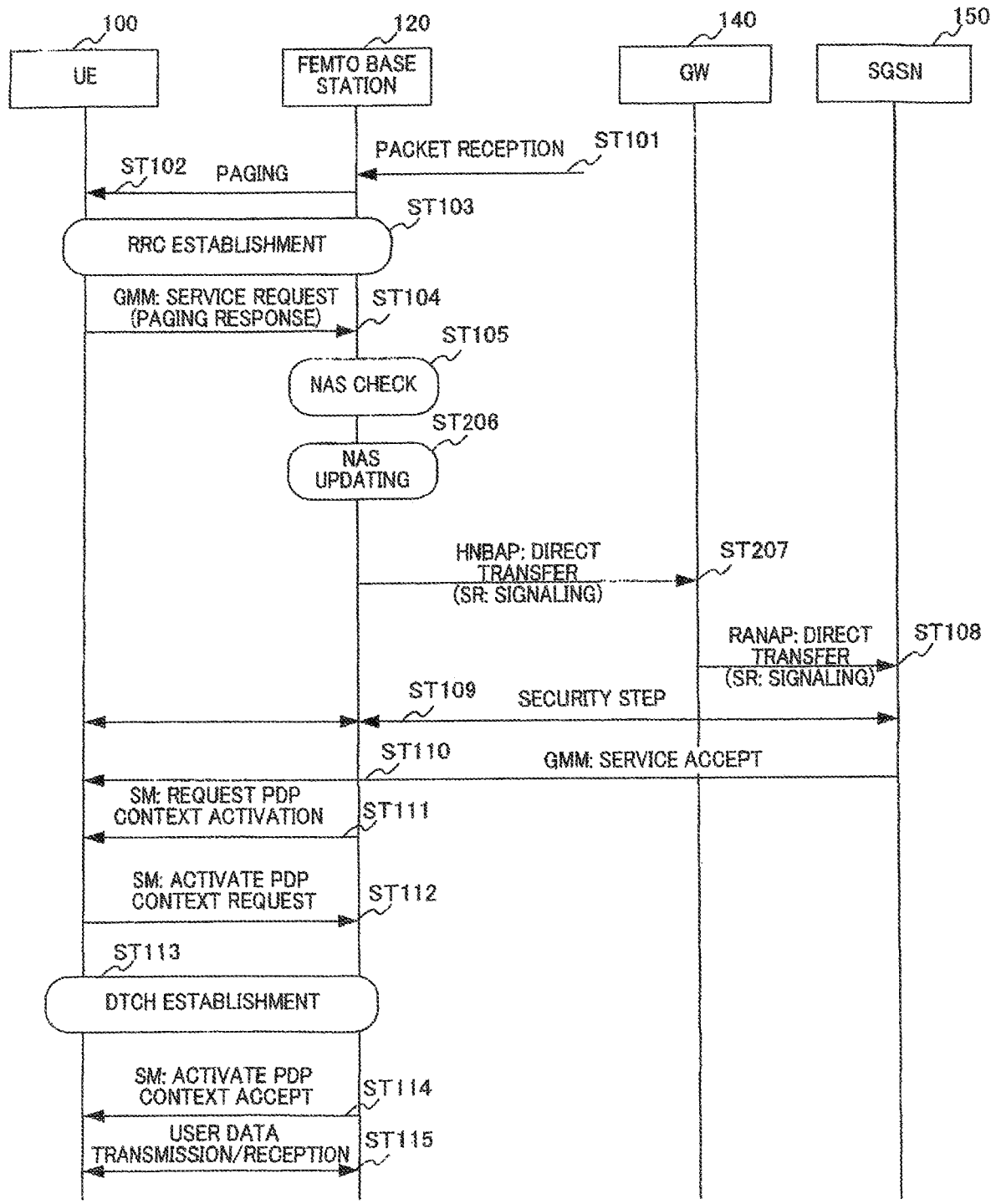
FIG. 12 is a sequence diagram showing the steps of call connection establishment between a UE and a femto base station according to embodiment 2 of the present invention.

FIG. 12 is a sequence diagram showing the steps of call connection establishment between UR 100 and femto base station 120 according to embodiment 2 of the present invention. Note that, parts in FIG. 12 that are the same as in FIG. 8 will be assigned the same reference codes as in FIG. 8, and their detailed descriptions will be omitted.

In FIG. 12, in ST 206, femto base station 120 picks up NAS information for UE 100 (service request: paging response), and updates service type in the NAS information from paging response to signaling.

In ST 207, femto base station 120 encodes the updated NAS information (service request: signaling) using an RANAP direct transfer, encodes this RANAP signal using a direct transfer of a protocol complying with the control interface specifications between femto base station 120 and GW 140 (for example, HNBAP or RUA), and outputs the results to GW 140.

In this way, with embodiment 2, a femto base station itself updates NAS information from a UE, and by this means is able to reduce the processing load of a GW and transmit communication traffic that directly arrives at the femto base station from the Internet or home network, to the UE, without a core network.

Embodiment 3

Embodiment 1 and embodiment 2 have been described such that a GW or femto base station updates the service type of a UE service request from paging response to signaling. However, in LTE/SAE system, which is directed to an object of providing improved mobile communication service and which is a next-generation mobile communication system having evolved from UMTS, it is required to ensure integrity and confidentiality to NAS information between a UE and a CN. It would become possible risk which degrades the security level to allow an intermediate node such as a GW and/or femto base station to modify directly the NAS information. So, a femto base station and UE that are applicable to both UMTS and LTE/SAE system will be described in this embodiment 3 of the present invention.

Figure 13:
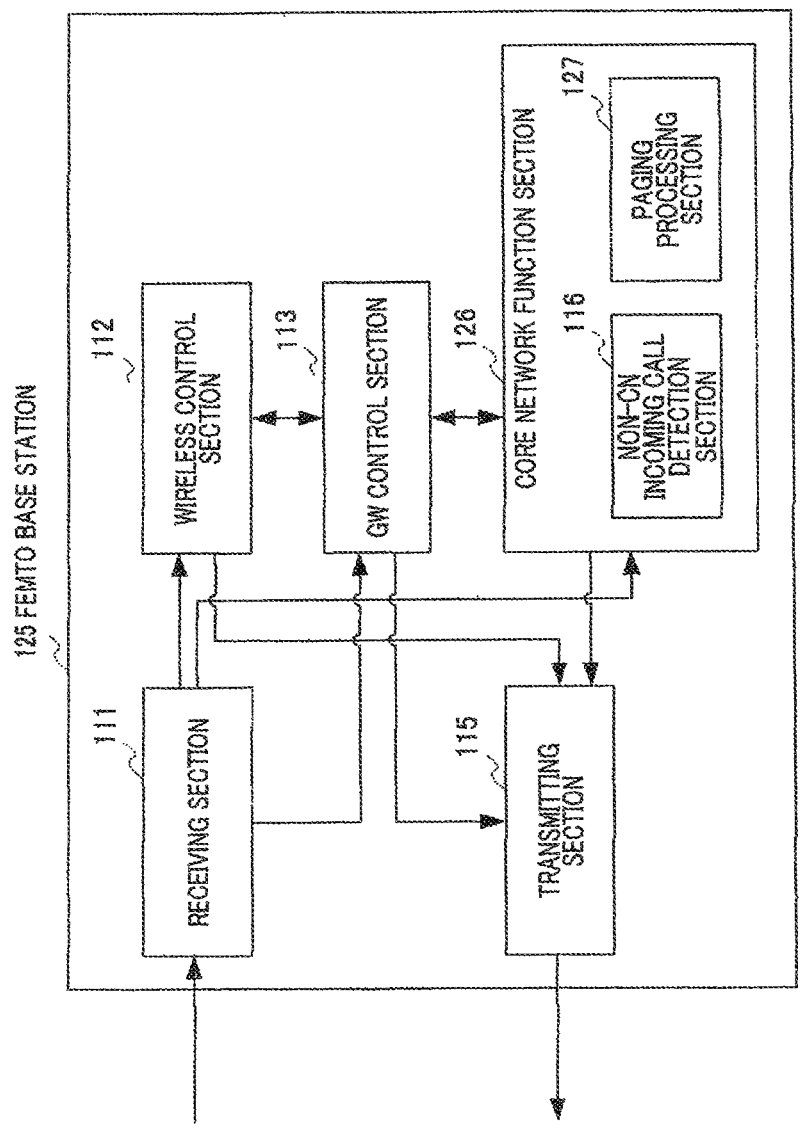
FIG. 13 is a block diagram showing a configuration of a femto base station according to embodiment 3 of the present invention.

FIG. 13 is a block diagram showing a configuration of femto base station 125 according to embodiment 3 of the present invention. Note that, parts in FIG. 13 that are the same as in FIG. 6 will be assigned the same reference codes as in FIG. 6, and their detailed descriptions will be omitted. FIG. 13 is different from FIG. 6 in adding paging processing section 127 to core network function section 126.

When non-CN incoming call detection information for UE 100 is output from non-CN incoming call detection section 116, paging processing section 127 creates a paging request including a non-CN incoming call information, and transmits this paging request to UE 100, via transmitting section 115.

Figure 14:
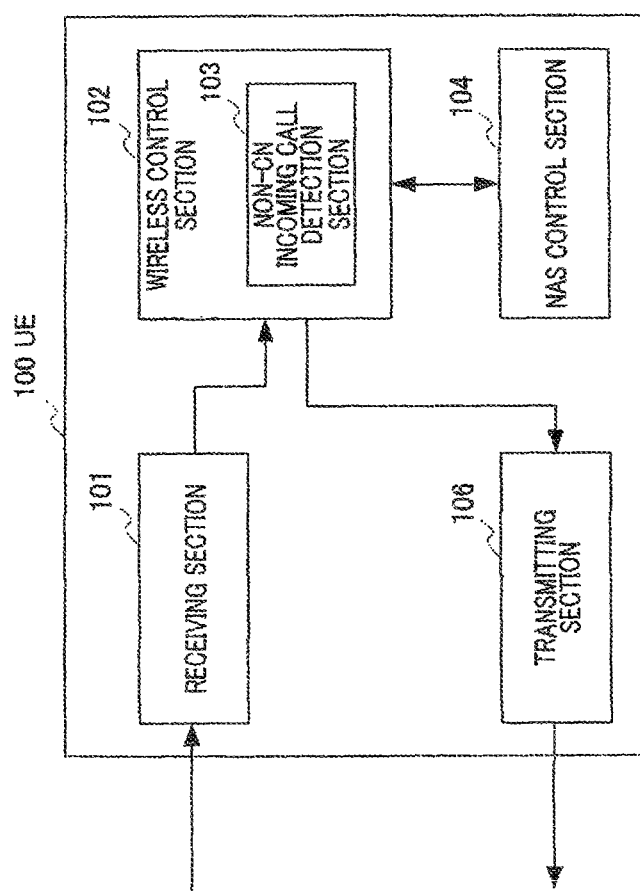
FIG. 14 is a block diagram showing a configuration of a UE according to embodiment 3 of the present invention.

FIG. 14 is a block diagram showing a configuration of UE 100 according to embodiment 3 of the present invention. In FIG. 14, receiving section 101 outputs an RRC signal and downlink user data transmitted from femto base station 125, to wireless control section 102.

Wireless control section 102 terminates the RRC signal output from receiving section 101, and establishes an RRC connection with femto base station 125. Also, wireless control section 102 monitors a paging channel (PCH) transmitted from femto base station 125 at predetermined timing, and judges whether or not a paging request for UE 100 is included. Wireless control section 102 further has non-CN incoming call detection section 103, and, when a paging request for UE 100 is received, non-CN incoming call detection section 103 judges whether or not non-CN incoming call information is included. If non-CN incoming call information is included, non-CN incoming call detection section 103 includes non-CN incoming call information in a paging request and outputs this paging request to NAS control section 104. Also, wireless control section 102 encodes NAS information output from NAS control section 104 as an RRC signal, and outputs the RRC signal to femto base station 125, via transmitting section 106, using uplink transmission steps prescribed by 3GPP.

NAS control section 104, upon receiving a paging request including non-CN incoming call information from non-CN incoming call detection section 103, creates a service request having a service type of signaling, and outputs the created service request (NAS information) to wireless control section 102. If the paging request does not contain non-CN incoming call information, NAS control section 104 outputs a service request having a service type of a paging response, to wireless control section 102 in a regular manner.

Transmitting section 106 transmits an RRC signal containing NAS information, output from wireless control section 102, to femto base station 125. Also, transmitting section 106 transmits user data output from higher application (not shown in the figure), to femto base station 125.

Figure 15:
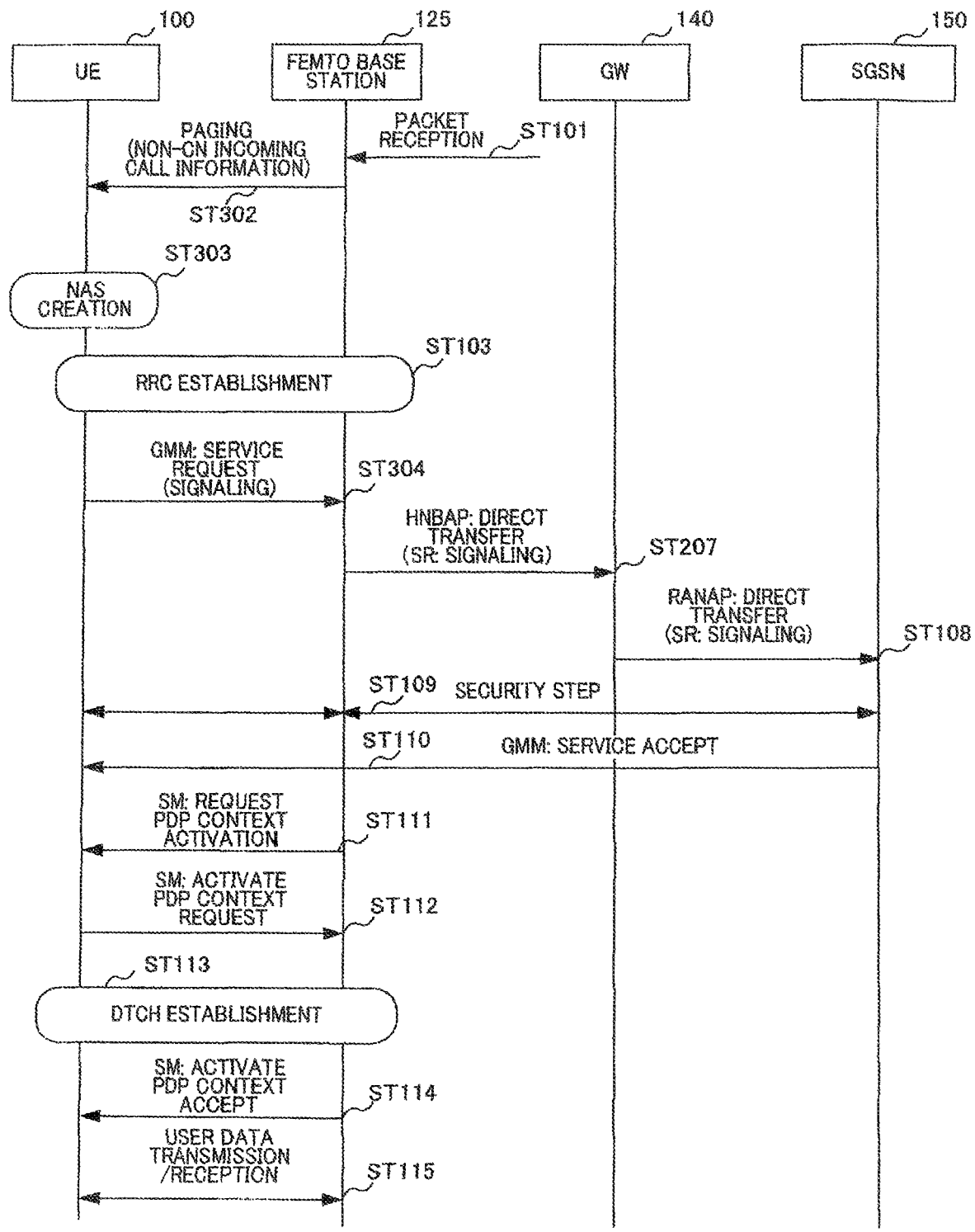
FIG. 15 is a sequence diagram showing the steps of call connection establishment between a UE and a femto base station according to embodiment 3 of the present invention.

FIG. 15 is a sequence diagram showing the steps of call connection establishment between UE 100 and femto base station 125, according to embodiment 3 of the present invention. Note that, parts in FIG. 15 that are the same as in FIG. 12 will be assigned the same reference codes as in FIG. 12, and their detailed descriptions will be omitted.

In FIG. 15, in ST 302, paging processing section 127 of femto base station 125 includes non-CN incoming call information in a paging request for UE 100, and transmits this paging request to UE 100.

In ST 303, NAS control section 104 of UE 100 creates a service request having a service type of signaling (NAS information creation).

In ST 304, UE 100 transmits an RRC signal containing NAS information and having a service type of signaling, created in ST 303, to femto base station 125.

In this way, according to embodiment 3, a femto base station includes non-CN incoming call information in a paging request and transmits this paging request, and, upon receiving processing of the paging request including non-CN incoming call information, a UE itself modifies NAS information, so that it is possible to guarantee the impartiality and ciphering of NAS information, and, consequently, in both UMTS and LTE/SAE systems, it is possible to transmit communication traffic that directly arrives at the femto base station from the Internet or home network, to the UE, without traversing mobile operator's core network.

Embodiments of the present invention have been described above.

Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2008-280339, filed on Oct. 30, 2008, including the specification, drawings and abstract, is incorporated herein by reference in its entirety.

INDUSTRIAL APPLICABILITY

The base station apparatus, gateway apparatus, call connection establishment method and wireless communication system according to the present invention are applicable to, for example, mobile communication systems.

The invention claimed is:

1. An integrated circuit configured to control operation of a user equipment (UE), the integrated circuit comprising:
   reception circuitry, which, in operation, receives a paging message from a traffic offloading apparatus for the UE when the UE is in idle mode, the paging message regarding downlink offload traffic arriving at the traffic offloading apparatus;
   control circuitry, which is coupled to the reception circuitry and which, in operation, controls transmission of a service request message as a paging response to the traffic offloading apparatus, a service type in the service request message indicating the paging response which triggers the traffic offloading apparatus to modify the service type in the service request message to indicate a UE-initiated service request and to send the modified service request message to a first Serving General Packet Service Support Node (SGSN).

2. The integrated circuit according to claim 1, wherein the traffic offloading apparatus is a femto base station.

3. The integrated circuit according to claim 1, wherein the traffic offloading apparatus has a Gateway General Support Node (GGSN) functionality.

4. The integrated circuit according to claim 1, wherein the traffic offloading apparatus is a second SGSN different from the first SGSN.

* * * * *